(12) United States Patent
Saucedo

(10) Patent No.: US 7,328,578 B1
(45) Date of Patent: Feb. 12, 2008

(54) INTEGRATED OTEC PLATFORM

(76) Inventor: Eduardo Saucedo, 1075 Pensive La., Great Falls, VA (US) 22066

( * ) Notice: Subject to any disclaimer, the term of this patent is extended or adjusted under 35 U.S.C. 154(b) by 477 days.

(21) Appl. No.: 11/165,277

(22) Filed: Jun. 24, 2005

Related U.S. Application Data

(60) Provisional application No. 60/618,607, filed on Oct. 15, 2004.

(51) Int. Cl.
*F03G 6/00* (2006.01)
(52) U.S. Cl. .................... 60/641.1; 60/641.7
(58) Field of Classification Search ............ 60/641.1, 60/641.7
See application file for complete search history.

(56) References Cited

U.S. PATENT DOCUMENTS

| | | | |
|---|---|---|---|
| 4,112,864 A | * | 9/1978 | Bergman ............ 114/265 |
| 4,210,819 A | * | 7/1980 | Wittig et al. ............ 290/52 |
| 4,312,288 A | * | 1/1982 | Finsterwalder et al. ..... 114/264 |
| 4,829,928 A | * | 5/1989 | Bergman ............ 114/125 |
| 5,555,838 A | * | 9/1996 | Bergman ............ 114/265 |

* cited by examiner

*Primary Examiner*—Hoang Nguyen

(57) ABSTRACT

An integrated platform to house an ocean thermal energy conversion (OTEC) system that utilizes: (i) a cold water circuit consisting of a way of receiving and distributing the cold water from the cold water pipe (CWP) to vertical conduits housing the condensers into collectors that discharge via large pumps into open discharge channels connected to the discharge water pipe (DWP); (ii) a surface water circuit consisting of a way of collecting and distributing the surface water to vertical conduits housing the evaporators to surface water collectors that discharge via large pumps into the same discharge channels connected to the DWP; (iii) means of adjusting the buoyancy of the integrated platform by adding water as ballast into floatation chambers in the hull surrounding the discharge channels or in a plurality of either vertical or horizontal flotation chambers to provide protection to the CWP and DWP and stability to the integrated platform. By adjusting the buoyancy of the platform such that the collectors are about level with the sea level, pumping requirements are minimized.

6 Claims, 9 Drawing Sheets

INTEGRATED OTEC PLATFORM

CROSS-REFERENCE TO RELATED APPLICATIONS

On Oct. 15, 2004, a Provisional Patent Application (PPA) was submitted. Confirmation number 3933 for Application No. 60/618,607 was mailed on Nov. 16, 2004. The following patent application refers to one of the inventions therein presented.

In addition, this application incorporates application Ser. No. 11/079,200 dated Mar. 15, 2005, titled Modular Vertical Floating Pipe and application Ser. No. 11/119,882 dated May 3, 2005, titled Heat Exchangers with Plastic Tube Sheets.

FEDERALLY SPONSORED RESEARCH

Not Applicable

SEQUENCE LISTING OR PROGRAM

Not Applicable

BACKGROUND OF THE INVENTION

The present invention relates to the Ocean Thermal Energy Conversion (herein referred as "OTEC") system and more particularly to a design of a platform for an OTEC plant that integrates the distribution and collecting systems for the cold and surface waters with the condensers and evaporators.

OTEC systems are energy producing systems that exploit the temperature difference between warm surface waters in tropical seas and the cold waters in deeper ocean strata. In a conventional Closed Cycle OTEC, a working fluid is pumped by a pump into an evaporator, where heat from warm water is transferred to generate a working fluid vapor. The vapor moves a turbo-generator to generate electricity by conventional techniques. The spent vapor is condensed utilizing cold sea water from deep waters as a heat sink. Further details are provided in the description of FIG. 1. Additional information about the OTEC technology can be found in "Renewable Energy from the Ocean—A Guide to OTEC" by Avery and Wu—Oxford University Press—1994.

Typically an OTEC system would include a plant mounted on a platform, a ship or barge; a large diameter cold water pipe extending about 1,000 m below the surface; one or several turbo-generators, and; a plurality of heat exchangers (herein referred to as "HXs" when referring to a plurality of elements or as "HX" when referring to only one) used as evaporators, heaters and condensers. Water temperature at depths of about 1,000 m is about 4° C., while surface water in the tropics is about 25-28° C. Although an OTEC system is conceptually rather simple, the energy available from such small temperature difference is little, requiring moving large quantities of both deep and surface water and very large equipments, which present a design challenge. As an illustration, to produce a meaningful amount of electricity, say 100 MW, would require a Cold Water Pipe (herein referred as "CWP") of 15-20 m in diameter and 1,000 m long; will require moving approximately 300 m³/s of both cold and surface water; about 10 million sqft of heat transfer surface in HXs; and a design for a platform that will minimize the energy consumption of pumping both surface and cold water. Having to raise the cold and surface water 1 m above the sea level will consume about 6 MW. Utilizing large, standard tube and shell HX of about 10,000 sqft would require 1,000 units. Utilizing small diameter finned tubes would increase the transfer area 4-7 times, but will still require 140-250 units, with each HX having to be fed by a water pipe of 4 to 6 ft. in diameter. Control valves and even following standard practice of placing valves before and after the HX is not practical and would produce large parasitic losses. The water distribution system needs to be simplified.

PRIOR ART

References in the literature for small to medium size OTEC plants (1-10 MW) as prototypes or demonstration projects, suggest the utilization of modified ships as platforms with references to larger units presented only as schematic diagrams without thorough details.

U.S. Pat. No. 4,312,288 to Finsterwalder (1982) presents an enclosed platform designed for an open cycle OTEC plant which incorporates an air cushion area to dampen the movement of the platform. The patent leaves many details unanswered that still needs substantial work. Most of the literature considers the OTEC closed cycle a more promising alternative. In an open cycle, the diameter of the fan/turbine to extract energy from water vapor at low pressure (vapor pressure of water at 20-25° C.) to produce a meaningful amount of electricity (100 MW) would have to be very large (more than 100 m) and thus will have very little tolerance to the continuous roll and heave in the open seas.

U.S. Pat. No. 5,555,838 to Bergman (1996) presents a platform that includes multiple sealed columns surrounding the cold water pipe providing buoyancy to the platform with power modules dispersed about the outer columns. Although the platform might be very stable, it is massive, weighing some 500,000 tons and the columns are cylindrical, 16 m in diameter and extending 75 m below the sea surface and would be difficult to construct since few shipyards might be able to provide such draft and would require offshore construction.

OBJECTS AND ADVANTAGES

It is an object of the present invention to provide for an integrated platform for an OTEC plant that will simplify several requirements: (i) a way of receiving and distributing the cold water from the CWP to the condensers; (ii) a way of collecting and distributing the surface water to the evaporators; (iii) a way of collecting the spent cold and surface water and discharging it through a Discharge Water Pipe (herein called "DWP"); (iv) a way of integrating the heat exchangers with the distribution systems for cold and surface water utilizing vertical conduits as shells for the heat exchangers as described in patent application Ser. No. 11/119,882, and; (v) simplifying the pumping requirements.

It is a further object of the present invention to provide for simplified paths for both cold and surface waters, eliminate the need to pump above sea level and reduce the pressure drop in the system, reducing the parasitic losses of the overall system.

It is a further object of the present invention to provide an integrated platform to receive the cold water from the CWP into a cold water distribution tank, distribute the cold water through a plurality of conduits housing the condensers, with a plurality of collectors to receive the spent cold water below the sea surface, thus simplifying pumping requirements to discharge the spent cold water into a discharge tank connected to the DWP.

It is a further object of the present invention to provide an integrated platform with a plurality of surface water distribution conduits which will feed conduits housing the evaporators, with a plurality of collectors to receive the spent surface waters, also below sea level and discharging it to the same collector connected to the DWP.

It is a further object of the present invention to house the evaporators and condensers of the OTEC plant inside vertical conduits, simplifying the water piping arrangements, substantially reducing the pressure drop within the system and thus lowering the pumping requirements and improving the efficiency of an OTEC plant.

It is a further object of the present invention to provide for a plurality of pumps located on top of the collectors to pump the spent water into the DWP, allowing for the utilization of ready available large pumps, rather then designing and constructing very large pumps as suggested by the literature.

It is a further object of the present invention to surround all or most of the integrated platform with a hull, having a plurality of flotation chambers to provide the desired buoyancy and providing for the desired external shape of the integrated platform.

It is a further object of the present invention to simplify the construction of the platform, utilizing concrete as construction material, in a shipyard capable of launching typical oil tankers.

It is a further object of the present invention to provide for means of maintaining, repairing or cleaning the HX in the conduits, simplifying maintenance of the OTEC plant.

SUMMARY OF THE INVENTION

The present invention provides for a practical and economical way of integrating several of the requirements of an OTEC plant in a simple design that eliminates complicated, bulky and expensive piping requirements to distribute and collect both cold and surface waters through the plant. The entire platform, including the hull, tanks, conduits and collectors could be built out of concrete in a regular shipyard capable of constructing large oil tankers.

The basis of the integrated platform is a large cold water distribution tank, of such dimensions as required to house all the plant, which is surrounded by a larger hull with buoyancy tanks to provide the desired floatation. The shape of the cold water distribution tank is assumed to be rectangular to optimize the path and piping of the working fluid. For a 100 MW plant, the dimensions of the distribution tank are estimated to be about 140 m long by 40 m wide. The cold water distribution tank will require a depth of 8-10 m in the center, tapering to 5-6m in the extremes. The distribution tank will have an opening in the bottom for the cold water pipe and preparations to connect both the cold water pipe and the discharge pipe.

Along the long axis of the cold water distribution tank, and about the same length of the distribution tank, there will be two discharge channels, one on each side of the platform, open in the upper edge and discharging into the discharge pipe. The discharge channel will be about 3 m wide. The depth of the discharge channel will extend from above sea level to the connection of the discharge channel.

A hull will be constructed, surrounding all or a portion of the discharge channels and enclosing the cold water distribution tank. The hull will be shaped following standard naval architectural guidelines to provide the required stability and reduce resistance to wind or currents. The spacing between the hull and the discharge pipe will provide the necessary buoyancy. Preliminary calculations indicate that spacing between the discharge channels and the hull of about 5 m would suffice. The hull could be substituted by a plurality of either vertical floating chambers extending from the sea surface to the upper part of the discharge water pipe, providing additional protection to the discharge water pipe or by a plurality of horizontal floating chambers to provide additional stability to the platform.

Inserted into the cold water tank, perpendicular to the longitudinal axis of the platform, a plurality of surface water distribution conduits will be constructed evenly interspaced about 10 m apart, except in the center section that will be reserved for the location of the turbo generator or generators. The surface water distribution conduits will be about 4 m wide and 3 m deep, extending all the way from one extreme of the hull to the other, with openings in the hull and discharge channels to allow surface water to flow through. Screens will prevent the entrance of fish or debris into the conduits. The surface water distribution conduits will pass through the hull, the flotation chambers and the discharge pipe hanging from the ceiling of the cold water distribution tank. If necessary, a vertical conduit could be incorporated inside the hull such that the opening of the surface water distribution conduits could be closer to the surface, thus capturing slightly warmer surface water.

A plurality of cylindrical columns or conduits will be raised vertically from the top of the cold water distribution tank on top of openings allowing the water to flow from the cold water distribution tank upwards, forming lines perpendicular to the long axis of the platform. Similarly, a plurality of similar cylindrical columns will be raised from the top of the surface water distribution channels located on the top of the cold water distribution tank, to allow the surface water to flow upwards, also forming lines along the same axis of the platform. The cylindrical columns or conduits will be utilized to house the HXs (condenser, evaporators and/or heaters). The cylindrical columns or conduits will be about 10 m high and about 4 m in diameter. Alternating lines of condenser conduits and evaporator conduits will be formed in pairs back to back, but providing a space in the front of each pair of lines of conduits for connecting the working fluid manifolds. Each conduit or column might have two manholes to allow passage for inspection, maintenance or repair. In addition, each conduit will have a structure to support the HX and appropriate connections to receive and discharge the working fluid.

On top of each line of condenser conduits a cold water collector will be constructed while on top of each line of evaporator conduits a surface water collector will be constructed. The collectors will be in a rectangular shape, approximately 4 m wide and 3 m tall, extending all the width of the platform, touching but not connected with the discharge channel. The collectors will have an opening to connect with the conduits underneath, and could be closed above, except for access holes (which will be closed during normal operations) of a diameter slightly larger than the diameter of the HX housed in the conduits located underneath, or open, provided that he walls extend above the water line.

The buoyancy of the platform will be controlled by adding sea water as ballast on some or all of the floatation chambers, in such way that the top of the collectors is slightly below sea level, thus assuring that the collectors and conduits are filled with water.

A pair of high volume/low head pumps will be placed on top of each collector, whose job will be limited to sucking water from the collector and discharging it in the discharge channel. The pumps will be relatively large, but still within the range of available pumps, each moving about 15 m³/s or about 240,000 GPM. As the pumps start sucking water out of the cold or surface water collectors, the pressure of water counteracting the gravity pull of the platform will maintain the collectors full of water, even if the water does have to flow through the total length of the CWP.

The arrangement of condensers, heaters and evaporators optimizes the distribution and collection of the working fluid. Furthermore, by locating a heater with each pair of lines of condensers and evaporators, the path of the working fluid and the location of several working fluid pumps can be simplified. In addition, since both high and low pressure manifolds are available in the vicinity, all working pumps could be driven by turbines utilizing the working fluid, thus improving the efficiencies and reducing the size of the main manifolds.

Further modifications and alternative embodiments of this invention will be apparent to those skilled in the art in view of this description. Accordingly, this description is to be construed as illustrative only and is for the purpose of teaching those skilled in the art the manner of carrying out the invention. It is to be understood that forms of the invention herein shown and described are to be taken as presently preferred embodiments. Various changes may be made in the shape, size, arrangement and materials of the various components. For example, the dimensions, the number of conduits, ratio of evaporators to condenser or heaters, number of distributors or collectors, or arrangement of the various manifolds for the working fluid, are described for illustrative purposes only and the present invention might be used with larger or smaller components, with a different number of the various components or location of specific components. Also, the various dimensions might be modified and compensating adjustments made elsewhere. Furthermore, the preferred embodiment shown in the attached diagrams provide for a number of collector and distributors, with a corresponding number of evaporators or condensers for illustration purposes, while the actual number will depend on an optimization to reduce cost. Furthermore, the use of square collectors and distributors for ease of drawing, does not intend to limit the idea to square or rectangular shapes. Moreover, the specific arrangements and number of many components might be changed while still utilizing the various aspects of the present invention including a cold water distribution tank, surface water distributors, conduits, collectors or manifolds. Thus equivalent elements or materials might be substituted for those illustrated and described herein and certain features of the invention may be utilized independently of the use of other features, all as would be apparent to one skilled in the art after having the benefit of this description of the invention.

In one embodiment, the present invention would substitute very large pumps placed in the upper portion of the CWP or surface water pipe connecting to a massive and complicated piping arrangement with a simple distribution and collection system that will substitute a few very large pumps (maybe 2 to 4 pumps) with many large (about 40) but readily available large pumps. Similarly, the present invention substitutes a surface water collecting pipe with several openings at the side of the platforms, which feed distributors and collectors. Similarly, the present invention integrates the heat exchangers with the distribution and collection system, simplifying piping requirements. Finally, the present invention provides for a novel and efficient way of discharging the spent waters through a Discharge Water Pipe ("DWP").

BRIEF DESCRIPTION OF THE DRAWINGS

The present invention will become more fully understood from the detailed description given herein below and the accompanying drawings which are given by way of illustration only and thus are not limitative of the present invention and wherein.

REFERENCE NUMERALS

9. Cold Water Pipe Opening
10. Cold Water Distribution Tank
11. Cold Water Pipe
12. Cold Water Floater
13. Discharge Water Pipe
14. Discharge Water Floater
15. Discharge Water Pipe Connecting Preparation
16. Cold Water Pipe Connecting Preparation
17. Cold Water Vertical Conduits
18. Surface Water Vertical Conduit
19. Surface Water Distribution Conduit
20. Horizontal Cold Water Collector
21. Horizontal Surface Water Collector
22. Main High Pressure Manifold
23. Main Low Pressure Manifold
24. Evaporator Manifold
25. Condenser Manifold
26. Heater Conduit
27. Working Fluid Pump
28. Condenser Discharge Manifold
29. Evaporator Feed Manifold
30. Cold Water Pump
31. Surface Water Pump
32. Discharge Channel
33. Surface Water Filtering Screen
34. Electric Motor for pumps
35. Turbine Driver for pumps 36. Hull
37. Sea Level
38. Upper Deck
39. Access Cap
40. Access Cold Water Distribution Tank
41. Evaporator
42. Submarine Plug
43. Horizontal Thrusters
44. Lateral Thrusters
45. Evaporator Discharge
46. Evaporator Feed
47. Maintenance Column Base
48. Maintenance Column
49. Floatation Chamber
50. Condenser
100. Turbo-generator
101. Condenser
102. Evaporator
103. Heater
104. Cold Water Pump
105. Working Fluid Pump
106. Surface Water Pump
107. Cold Water Inlet Pipe
108. Cold Water Discharge Pipe
109. Surface Water Inlet Pipe
110. Surface Water Discharge Pipe

DETAILED DESCRIPTION OF THE

Preferred Embodiment

Figure 1:
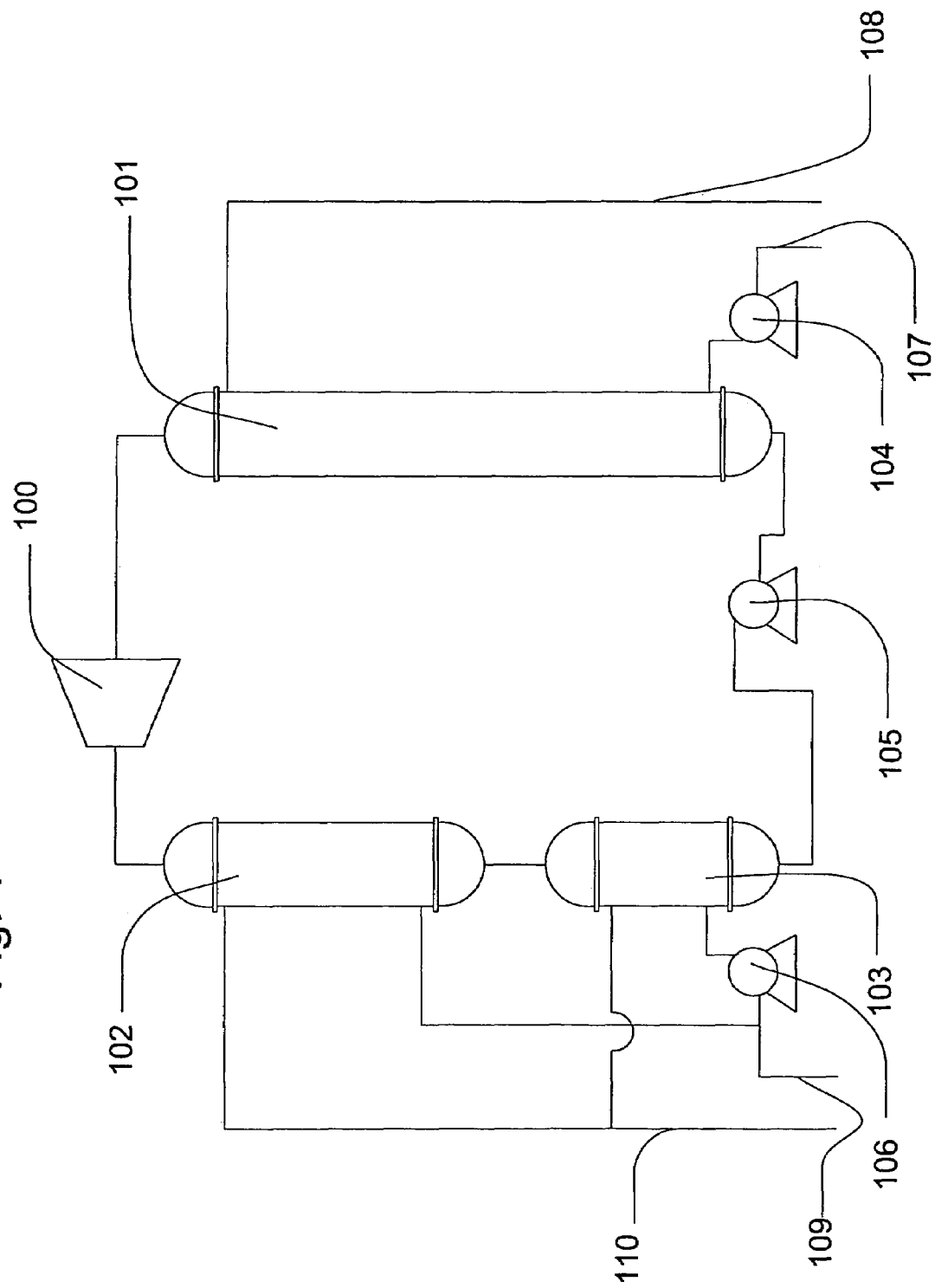
FIG. 1 illustrates a block diagram of a Closed Cycle OTEC system.
Figure 8:
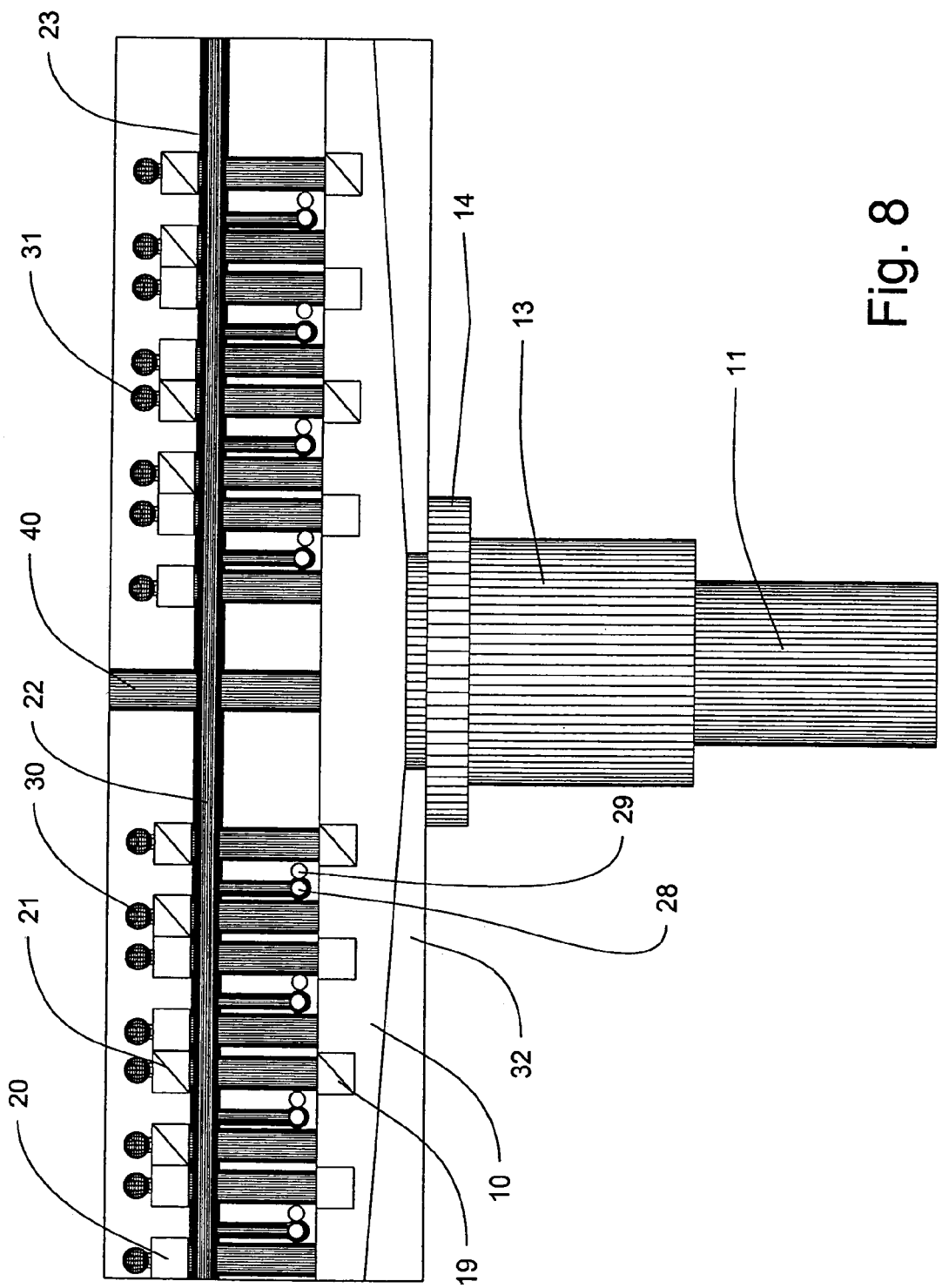
FIG. 8 illustrates a cross sectional lateral view of the Integrated OTEC platform.
Figure 9:
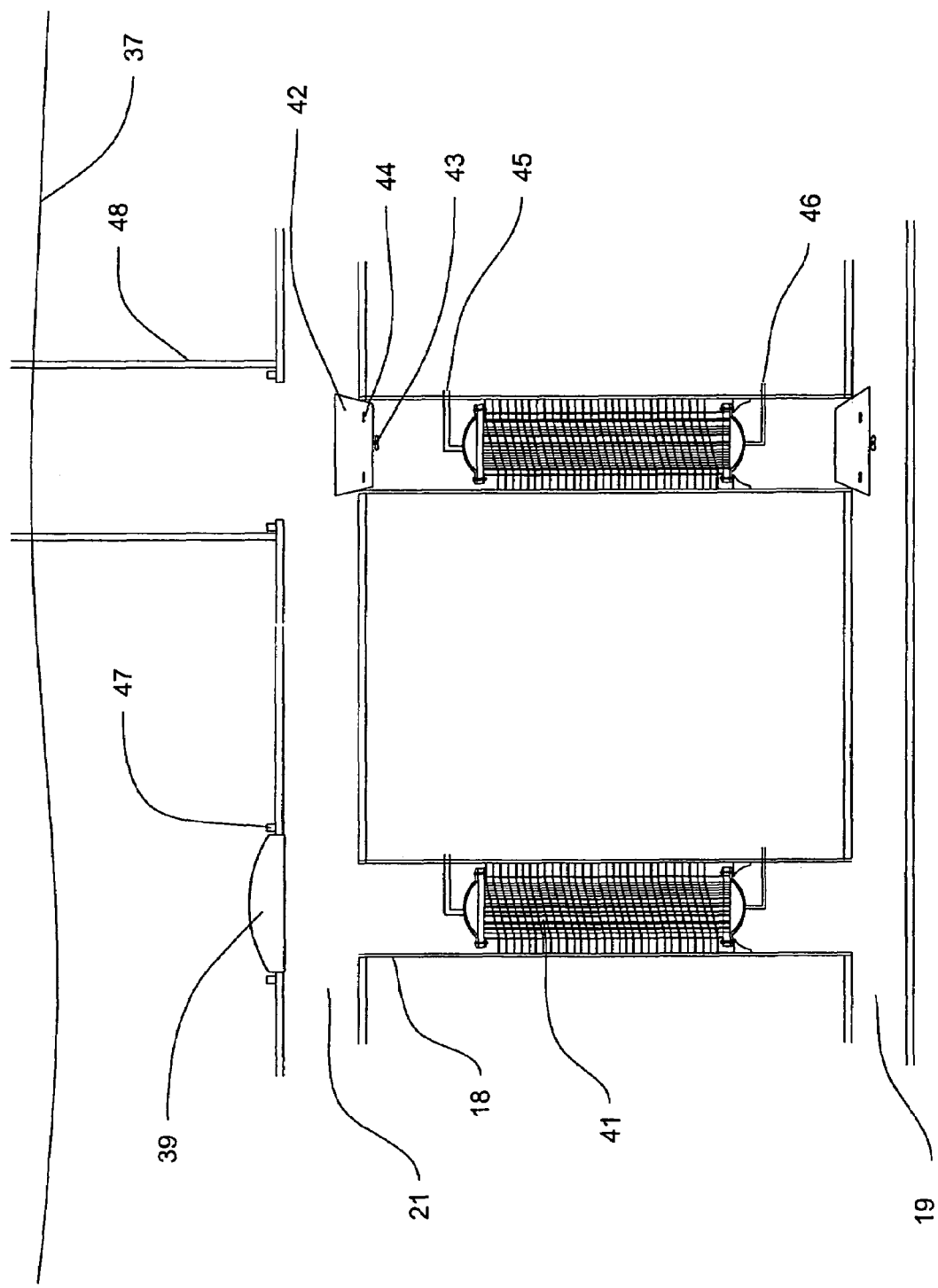
FIG. 9 illustrates the placement of submarine plugs to provide maintenance to one of the HX bodies.

FIG. 1 illustrates a block diagram of a Closed Cycle OTEC plant. The process is rather simple. Cold water brought to the surface by the cold water inlet pipe 107 is injected by a cold water pump 104 into a condenser 101 where the working fluid is liquefied. The spent cold water is discharged by the cold water discharge pipe 108. By means of the working fluid pump 105 the condensed working fluid is fed first into the heater 103 and then into the evaporator 102 where the liquid working fluid is first heated and then is evaporated. The high pressure working fluid vapor produced by the evaporator enters into the turbo-generator 100 and the spent vapor is then fed into the condenser 101, closing the cycle. The surface water, fed by the surface water inlet pipe 109 is pumped into the heater 103 and evaporator 102 by the surface water pump 106 and discharged by the surface water discharge pipe 110. The simple block diagram masks many complexities of the practical implementation. Either extremely large equipment is designed and built or a very large number of large components are used together. As an illustration, the inlet manifold feeding one turbo-generator could be 7-10 m in diameter, which is almost an order of magnitude larger than typical 24-36" (0.6 to 0.9 m) pipes used in big industries. The water pipes connecting each of the condensers or evaporators could be about 2 m in diameter and the manifolds would be many times bigger. The present invention of an integrated OTEC platform aims to simplify the requirements. For ease of understanding of the present invention, FIGS. 2 to 5 present details of different components separately, while FIGS. 8 and 9 present cross views across midship of a front view and a lateral view of the integrated platform and its components.

Figure 2:
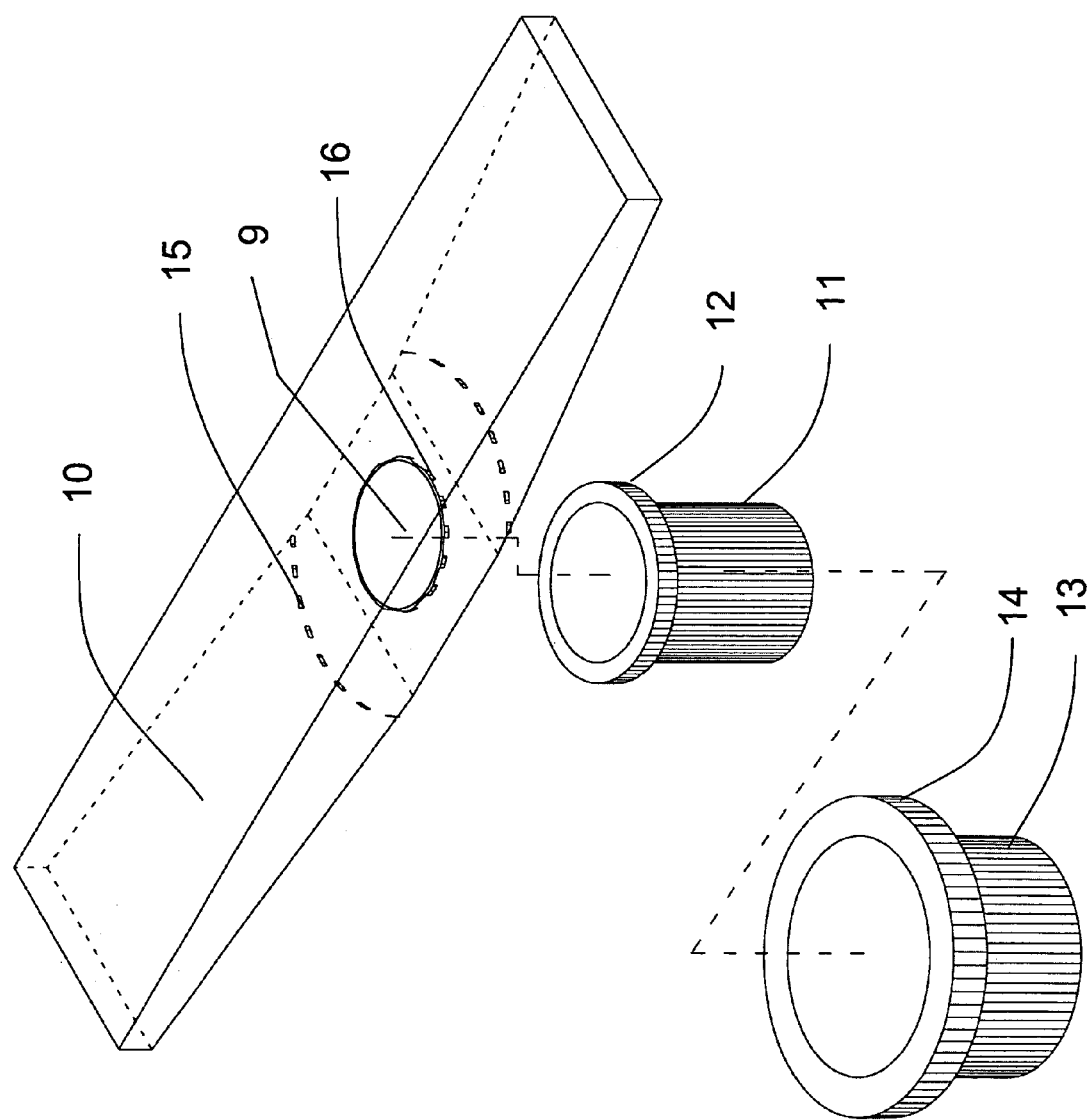
FIG. 2 illustrates the basis of the Integrated OTEC Platform formed by the cold water distribution tank, and the connection of the Cold Water Pipe ("CWP") and Discharge Water Pipe ("DWP").

FIG. 2 shows the basis of the integrated OTEC platform. The integrated platform contains a large cold water distribution tank 10, dimensioned and shaped in such a way to provide the required area for the installation of the OTEC plant. Although different shapes could be utilized to enhance the stability of the platform, the diagram presents a rectangular water distribution tank to minimize piping requirements for the working fluid. To house a 100 MW OTEC plant would require a cold water distribution tank of about 140 m in length and 40 m wide. The distribution tank will be surrounded first by a discharge channel and then by flotation areas (not shown on FIG. 2). The outside shape of the platform would be streamlined by the outside hull and floatation areas which will be smoothing the edges to reduce drag. The cold water distribution tank will have a cold water pipe opening 9 to receive the cold water from the cold water pipe.

The cold water pipe (and the discharge water pipe) will be constructed following the ideas presented in the Modular Vertical Floating Pipe patent application Ser. No. 11/079,200 of Mar. 15, 2005, incorporated herein as reference. The modular vertical floating pipes consist of a plurality of segments forming the pipes, each segment formed by two portions, with a shorter upper portion of a diameter slightly larger that the lower portion, with a floater held in place by the enlargement of the upper portion. To form the pipe, the lower, thinner segment of one module is inserted into the wider upper segment of another module, with the additional weight of the upper module counteracting the buoyancy provided by the floaters of the lower segments, pushing it down until the floater of the upper segment takes the weight of the upper segment and equilibrium is reached. To reach the desired depth, additional modules would be inserted in similar fashion. The concept is applicable to the cold water pipe and the discharge pipe, each one with its corresponding floater. The difference in diameter between the upper wider female portion of one segment or module and the lower male portion of the segment inserted into the female opening of the lower segment provide some flexibility and thus slight bending capabilities. FIG. 2 shows only one module of the cold water pipe 11 and its corresponding cold water pipe floater 12 and one module of the discharge water pipe 13 with its corresponding discharge water pipe floater 14. The cold water pipe will be inserted inside the discharge pipe in a concentric fashion. The diameter of the discharge water pipe will be predetermined by the needed dimensions to provide for an annular flow in the area outside the cold water pipe and its corresponding floaters and the flow rates of the combined spent surface and cold waters. The length of the discharge water pipe will be determined by the discharge temperature of the mixed spent waters and the local temperature profile, aiming to discharge the waters at the isothermal depth. The cold water pipe and the discharge water pipe are connected to the platform via the discharge water pipe connecting preparation 15 and the cold water pipe connection preparation 16. The preparations are only required to be the equivalent of the male section of the different pipes, allowing coupling the first or upper module of the cold water pipe and the discharge water pipe with the platform. The preparations to receive the pipe could include (not shown) a simple surrounding cylindrical segment to provide some protection for the cold water pipe and a housing element, cylindrical in the interior but shaped on the outside with a concavity forming a rudimentary keel to provide additional protection to the discharge pipe.

Figure 3:
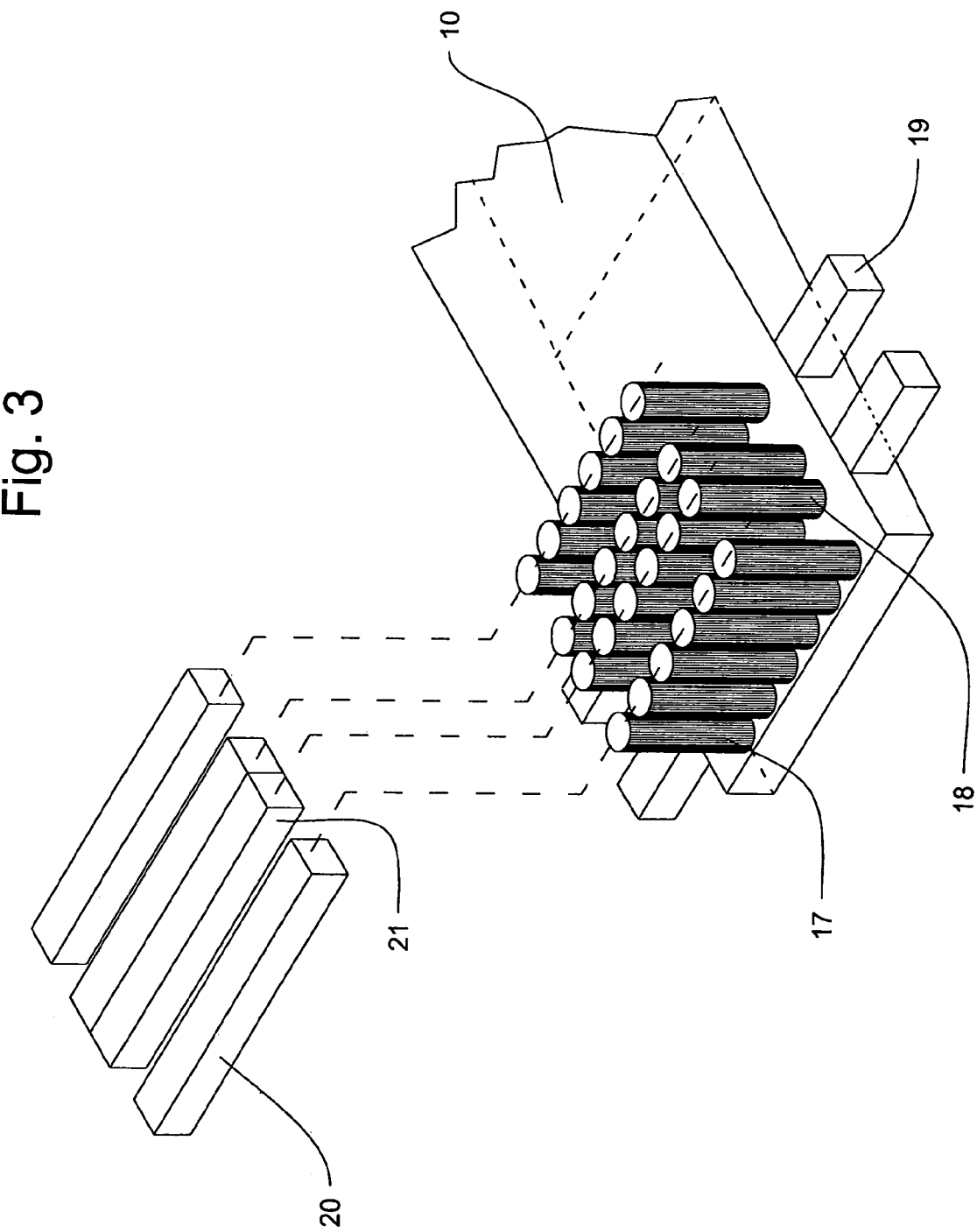
FIG. 3 illustrates a portion of the Integrated OTEC Platform with a plurality of horizontal surface water distribution conduits, the placement of a plurality of vertical conduits housing condensers and evaporators and the corresponding horizontal cold water and surface water collectors.

FIG. 3 incorporates a few additional details on a portion of the integrated platform, showing only a portion towards the edge of the long axis. To minimize pumping requirements and eliminate cold water distribution piping to condensers, cold water vertical conduits 17 will directly connect the cold water distribution tank 10 with horizontal cold water collectors 20. The cold water vertical conduits 17 will be concrete or steel cylindrical columns, of such diameter as required to house the condenser. Similarly, surface water vertical conduits 18 will connect the surface water distribution conduits 19 with the horizontal surface water collectors 21. The surface water distribution conduits 19 collect water from outside the floating chambers of the platform, and are shown passing through the cold water distribution tank, hanging from the ceiling of the cold water distribution tank.

Figure 4:
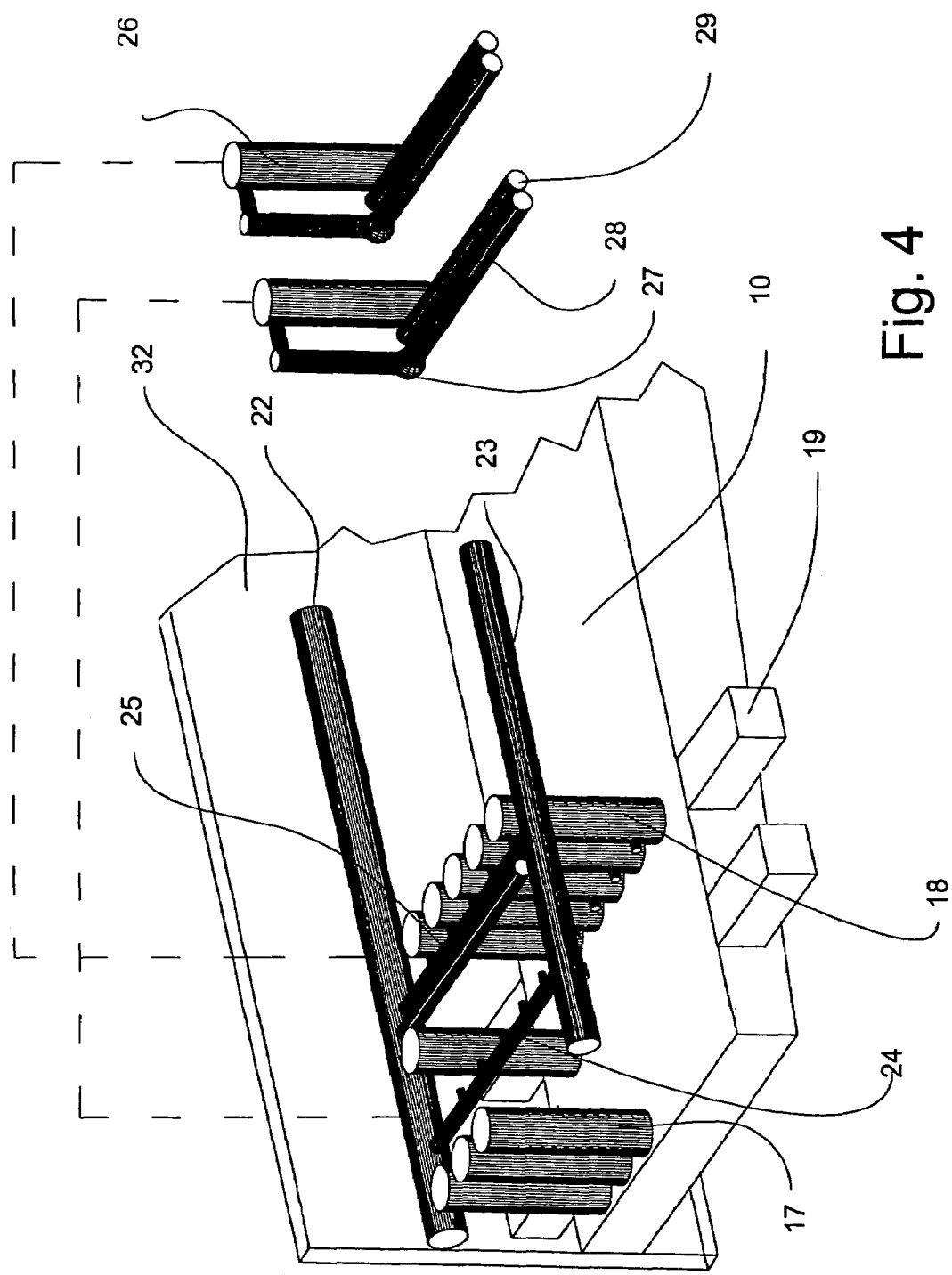
FIG. 4 illustrates a portion of the Integrated OTEC Platform showing the placement of the distribution manifolds for the working fluid to the evaporators and condensers and the location and connection of the working fluid heater.

FIG. 4 shows additional details of the working fluid piping arrangement for the same portion of the platform. The evaporator discharge manifold 24 connects the evaporators with the main high pressure manifold 23, while the condenser manifold 25 connects the condensers with the main low pressure manifold 22. The main high pressure manifold coming out of the evaporators will be feeding the turbo generator (not shown) which will discharge the spent working fluid into the main low pressure manifold to be fed into the condensers.

Also shown in FIG. 4 are the arrangement for the heater and the low pressure connections of the OTEC cycle. The heater is connected via a similar surface water vertical conduit 26 to the surface water distribution conduits 19 and discharging to the same horizontal surface water collectors 21. The spent working fluid discharged by the turbo-generator into the main low pressure manifold is fed into the condensers via the condenser manifold 25 and the condensed liquid feeds the condenser discharge manifold 28, which feeds the working fluid pump 27 which discharges the high pressure working fluid liquid into the upper part of the heater. The heated liquid working fluid exits the heater into the evaporator feed manifold 29 which supply the evaporators. FIG. 4 also shows a portion of the discharge channel 32.

Figure 5:
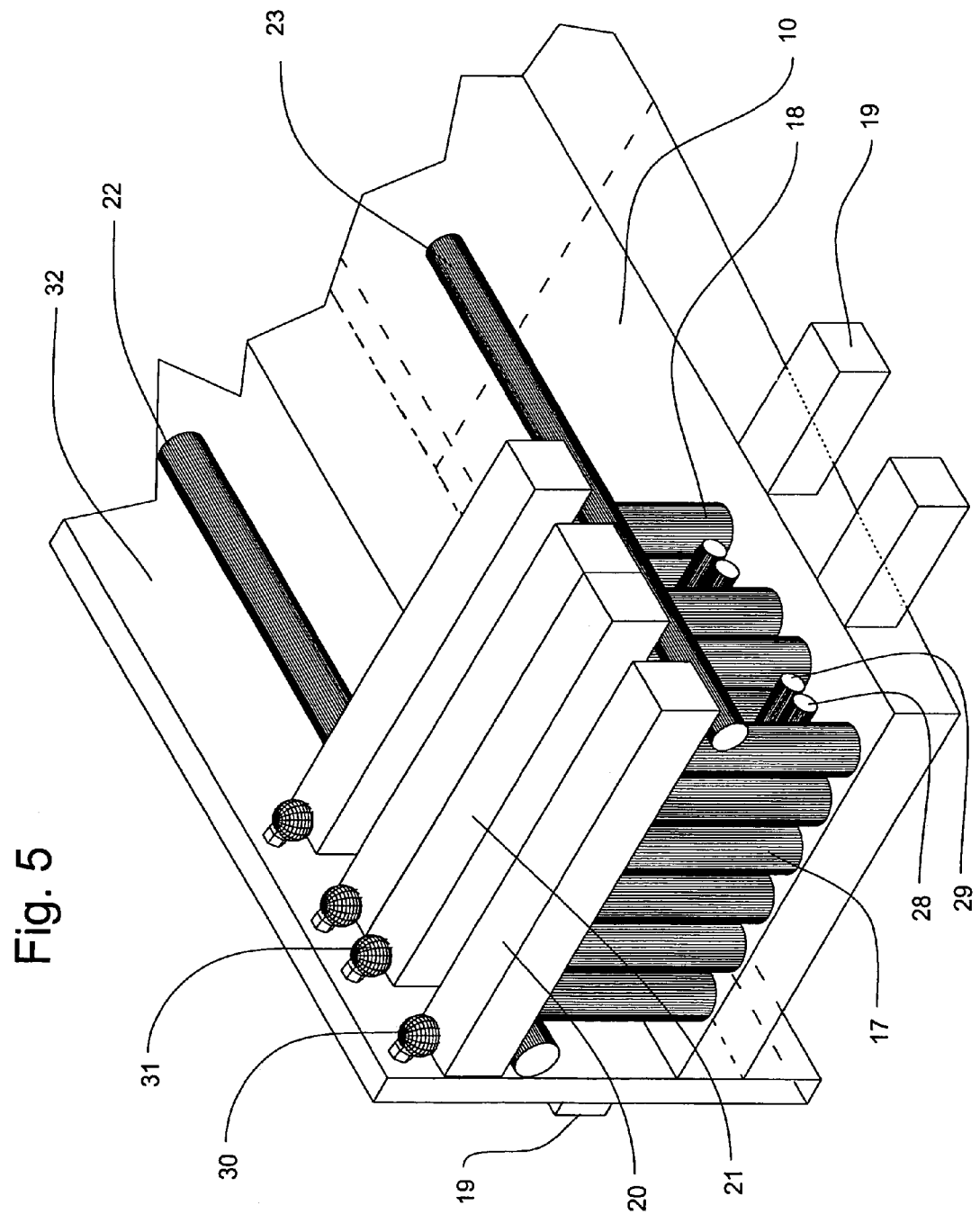
FIG. 5 illustrates an assembled portion of the Integrated OTEC platform with the main manifolds for the working fluid connecting the distribution manifolds with the main turbo-generator and the location of the cold and surface water pumps.

FIG. 5 integrates details shown in FIGS. 3 and 4, showing in addition the placement of the pumps discharging into the discharge channel 32. Cold water pumps 30 will be placed in top of the horizontal cold water collectors 20 and surface water pumps 31 will be placed in top of the horizontal surface water collectors 21. Both pumps will discharge directly into the discharge channel 32. The discharge channels (one on each side of the cold water distribution tank) will be connected to the discharge water pipe at the bottom of the cold water tank. The discharge channels will be open to the air. Flotation chambers (not shown) will surround the discharge channel, providing sufficient buoyancy so that the pumps placed on top of the cold water and surface water collectors will be basically at sea level. Sea water would be used as ballast in some of the floatation chambers to maintain the platform at the desired level.

The above arrangement has several advantages. Basically, the weight of the platform fills the cold and surface water collectors. As water is pumped by either the cold water pumps or the surface water pumps, water rushes in to fill the void, even if it has to travel the length of the cold water pipe. The arrangement also substitutes very large pumps, specifically designed for the OTEC plant, with many (20-40) large but available pumps for other applications. As presented, the requirement of having the surface water distribution conduits passing through the cold water distribution tank assumes that the evaporator and condensers are of similar size, but depending on the optimization parameters, if the condensers are larger than the evaporators, the surface water conduits could be above the cold water distribution tank. The separation between the top of the surface water collectors and the cold water collectors with sea level needs to be minimized to reduce the pumping requirements, but such separation does not need to be equal because the difference of densities between the cold water and surface water would still require the cold water to be raised about five feet (1.5 m).

Figure 6:
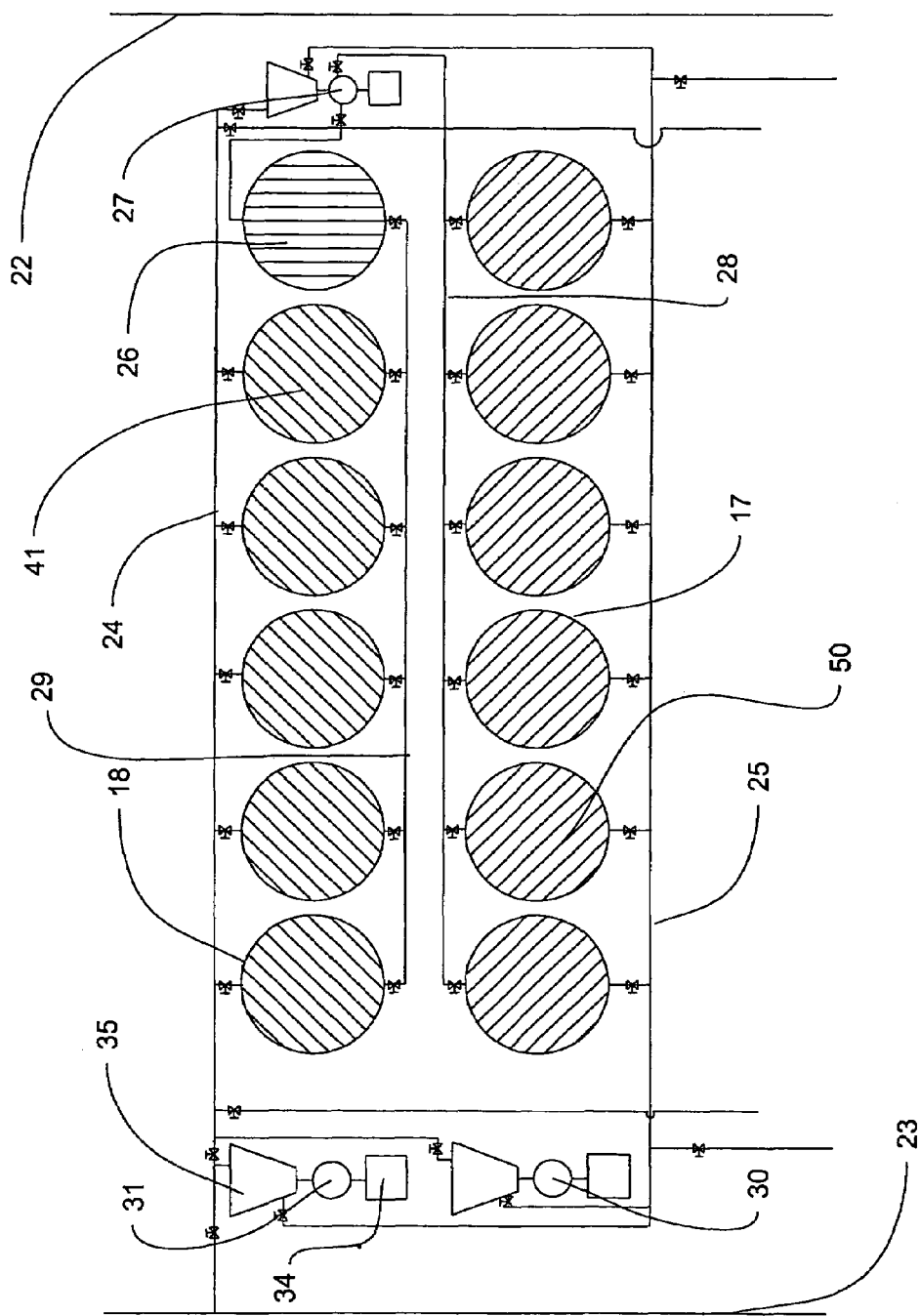
FIG. 6 illustrates a block diagram of the connection between a module of condensers and evaporators with a heater and diverse pumps.

FIG. 6 shows a block diagram of the working fluid circuit in one of the areas presented in the previous figures. The low pressure manifold 22 feeds the condenser feed manifold 25 which distributes the low pressure working feeds fluid into the upper portion of six condensers 50 where the working fluid in condensed into a liquid. The condensed working fluid discharges in the lower portion into the condenser discharge manifold 28 which transfers the condensate into the working fluid pump 27 which increases the pressure of the condensate and delivers the working fluid first to the upper portion of the heater 26 where it is warmed. The heater discharges the working fluid into the evaporator feed manifold 29 which distribute the working fluid into five evaporators 41 where the working fluid is vaporized. The evaporators discharge the working fluid vapor at the top of the evaporators into the evaporator manifold 24 which feeds the high pressure manifold 23. Taking advantage of the location, the pumps (the working fluid pump 27, the cold water pump 30 and the surface water pump 31) could also be driven by turbines, as shown by the lines connecting the turbine 35 to the evaporator manifold 24 and discharging the spent (low pressure) working fluid into the condenser manifold 25. The pumps are also connected to electric motors for start up. A plurality of valves isolates each piece of equipment for maintenance and/or repair. Although the diagram shows six condensers, five evaporators and one heater per section, any number of condensers, evaporators and heaters could be utilized.

Figure 7:
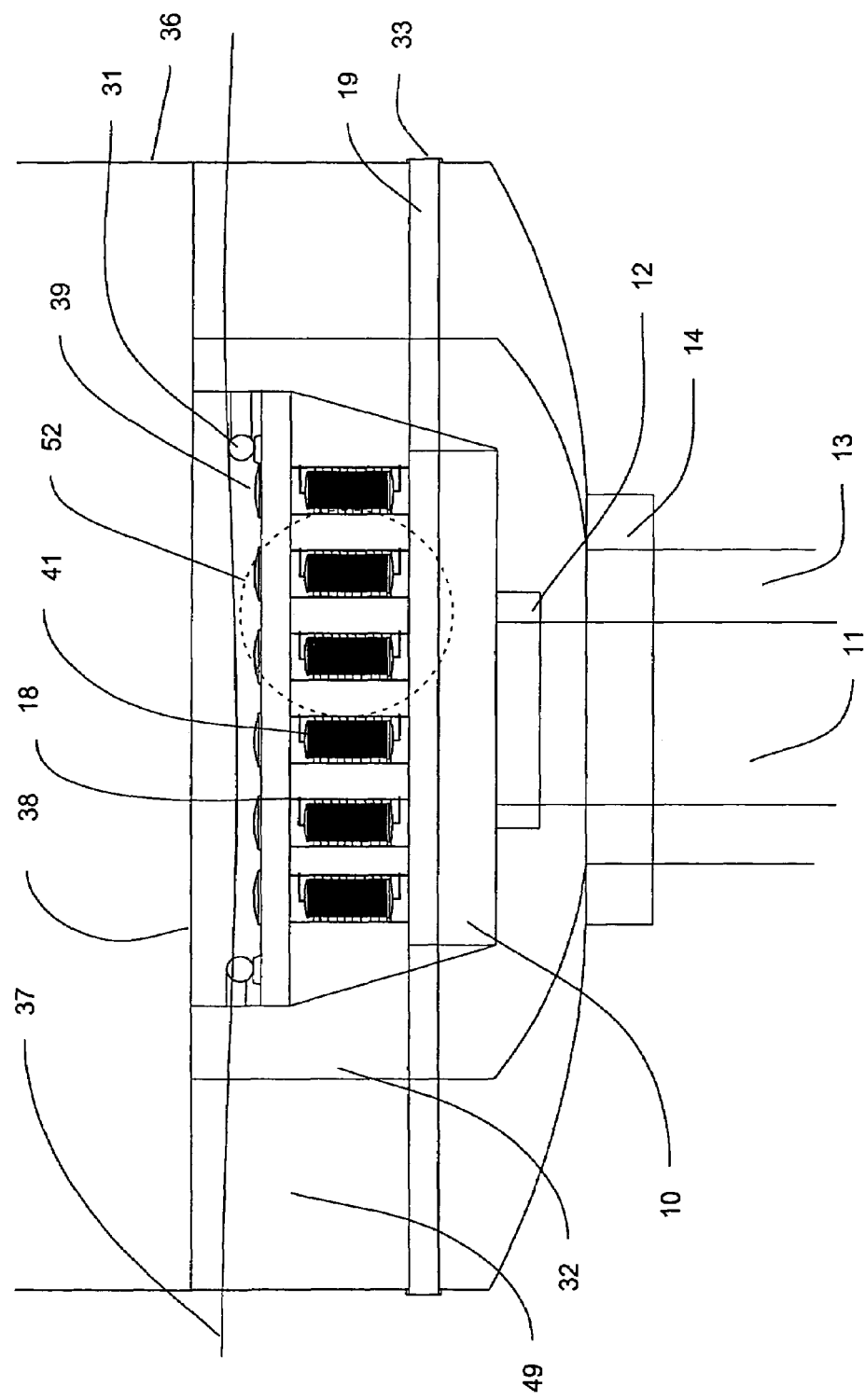
FIG. 7 illustrates a cross sectional front view, taken midway along a line by the evaporator conduits.

FIG. 7 shows a cross section of the platform along a line drawn in the middle of the evaporator conduits. The platform is surrounded by a hull 36, providing buoyancy by a plurality of floatation chambers 49. The figure schematically shows the connection of the cold water pipe 11 with the cold water distribution tank 10 and the connection of the discharge channel 32 with the discharge pipe 31. The surface water distribution conduit 19 extends from the cold water tank, passing through the discharge channel 32 and the floating chambers 49 to the outside of the hull 36 and has one screen 33 in each end. The platform contains one or several decks 38 above sea level 37 with the majority of the OTEC equipment located below sea level. If the OTEC plant is not operating, the cold water tank, the distribution channels and collectors will be full of water and the discharge channel will be filled to sea level. Once the OTEC plant is operating the cold water and surface water pumps will only need to overcome the pressure drop in the system moving water through the equipment, discharging in the discharge channel. A sophisticated control system would cause large pressure drops in the system and thus high parasitic losses, but some control could be achieved by controlling the turbines that are driving the cold water and surface pumps, regulating the temperature in the condensers and evaporators.

FIG. 8 shows a cross view along the longitudinal axis of the platform, showing the preferred layout of the equipment. The cold water distribution tank and the discharge channel extend all the length of the platform with the turbo generator or generators (not shown) occupying the center of the platform. In previous figures, the surface water distribution conduits 19 are shown flat and horizontal. However, it might be desirable to lift the opening of the distribution conduit closer to the surface, by incorporating a vertical conduit in the space between the discharge channel and the opening of the hull, to assure that the OTEC plant has access to the warmer surface water.

FIG. 9 shows details along broken line 52 of FIG. 7, to provide a mechanism to repair the heat exchangers. The mechanism is applicable to the condensers, heaters or evaporators, but is shown as illustration for the evaporators. During steady operation, an access cap 39 will cover each one of the evaporators. The access caps will have a diameter slightly larger than the diameter of the condensers or evaporators, as the case may be, to allow removal of the equipment. If one of the HX needs repairs, a cylindrical repair column 40 will have to be placed in top of the access cap 39. The repair column will be of such length that it will extend from the surface water collector 21 to a height above the sea level 37. Once the repair column is in place, and the access cap 39 is removed, the water will rush in, to reach sea level. A plug submarine 42 will be placed in the repair column 40 and further lowered to close the upper portion of the surface water vertical conduit 18. The submarine plug 42 will be propelled and controlled by conventional means (could be radio controlled and battery operated), surrounded by a rubber like deformable material and having the appropriate dimensions to allow plugging the conduit. A similar submarine plug will be inserted via the surface water distributors by removing one of the screens 33. The submarine plug 42 is expected to be able to move/displace upside down, and will be directed to plug the bottom part of the surface water vertical conduit 18, isolating the evaporator in this illustration. The conduit would be drained and the equipment serviced by entering into manholes (not shown), or if necessary, after disconnecting the HX, the HX could be lifted after removal of the upper submarine plug and repair outside the conduit. Similar arrangement could be utilized to access the upper part of the condensers but will require the access column 40 shown in FIG. 8 to lower the submarine into the cold water distribution tank, to access the lower portion of the cold water vertical conduit 17.

The evaporators, condensers and heaters to be utilized will be constructed following the ideas presented in the Heat Exchangers with Plastic Tube Sheet patent application Ser. No. 11/119,882 of May 3, 2005, incorporated herein as reference. The heat exchangers incorporate plastic spacers inserted along the tubes, retractable external baffles that would allow modifying the horizontal axial dimension and plastic tube sheets. The spacers and external baffles will be placed in such predetermined location as to provide for helicoidal baffles that will be forcing the water to follow a predefined path along the HX. Closing the external baffles will allow the HX to be removed from the conduit.

What is claimed is:

1. An ocean thermal energy conversion (OTEC) integrated platform, comprising
   a) an integrated cold water circuit, comprising:
      i) a cold water distribution tank;
      ii) a plurality of horizontal cold water collectors, and;
      iii) a plurality of cold water vertical conduits connecting in the lower portion with said cold water distribution tank and in the upper portion with said cold water collectors, each of said cold water vertical conduits forming an open shell to house a condenser;
   b) a plurality of discharge channels extending from above the water line to the bottom of the cold water distribution tank;
   c) a hull surrounding all or a portion of the discharge channels and the cold water distribution tank, with a plurality of floatation chambers;
   d) an integrated surface water circuit, comprising:
      i) a plurality of surface water distribution conduits, passing through the discharge channels and the hull to collect surface water;
      ii) a plurality of horizontal surface water collectors, and;
      iii) a plurality of surface water vertical conduits connecting in the lower portion with said surface water distribution conduits and in the upper portion with said surface water collectors, each of said surface water vertical conduits forming an open shell to house either an evaporator or a heater, and;
   e) alternating lines of the condenser conduits and evaporator conduits are formed in pairs back to back, being connected to fluid manifolds forming parts of an OTEC plant inside the OTEC platform.

2. The integrated OTEC platform of claim 1 is built from a group of materials consisting of steel and concrete.

3. The integrated OTEC platform of claim 1, in which said cold water distribution tank has an opening and means to receive the cold water pipe and means of attaching the discharge water pipe.

4. The integrated OTEC platform of claim 1, in which said horizontal cold water collectors and the horizontal surface water collectors could have the upper surface closed and located slightly below the platform water line or could be open, in which case the walls forming the collector should extend above the platform water line.

5. The OTEC platform of claim 1, in which pumps or other means of displacing or moving liquids will be placed on top of the surface water collectors and cold water collectors to transfer water from said collectors into the discharge channel, where said pumps would be driven by conventional techniques, including turbine drivers or electric motors.

6. The OTEC platform of claim 1, in which said hull surrounds all or only a portion of the discharge channels and the cold water tank, with the space between the hull and the discharge channel providing additional displacement volume for buoyancy, such space could be broken by walls or other conventional means into a plurality of floating chambers, with some or all the floating chambers incorporating means of adding ballast to regulate the buoyancy, and said hull to be shaped using standard naval architecture guidelines to maximize stability.

* * * * *